US011970088B2

(12) United States Patent
Otsuka et al.

(10) Patent No.: US 11,970,088 B2
(45) Date of Patent: Apr. 30, 2024

(54) SEAT CONTROL SYSTEM

(71) Applicant: SUBARU CORPORATION, Tokyo (JP)

(72) Inventors: Yusuke Otsuka, Tokyo (JP); Osamu Okada, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/932,338

(22) Filed: Sep. 15, 2022

(65) Prior Publication Data
US 2023/0094329 A1 Mar. 30, 2023

(30) Foreign Application Priority Data
Sep. 29, 2021 (JP) .................................. 2021-159754

(51) Int. Cl.
B60N 2/02 (2006.01)
(52) U.S. Cl.
CPC .......... B60N 2/0248 (2013.01); B60N 2/0268 (2023.08)
(58) Field of Classification Search
CPC ....................... B60N 2/0248; B60N 2002/0268
See application file for complete search history.

(56) References Cited

U.S. PATENT DOCUMENTS

| 10,214,118 B1* | 2/2019 | Jain ........................ B60K 35/00 |
| 11,059,440 B2* | 7/2021 | Brown .................. B60R 16/037 |
| 2012/0007401 A1 | 1/2012 | Hashimoto |
| 2014/0316660 A1* | 10/2014 | Le .......................... B60N 2/002 701/49 |
| 2016/0280161 A1* | 9/2016 | Lippman ............... B60R 16/037 |
| 2020/0353844 A1* | 11/2020 | Yaldo ...................... B60N 2/06 |

FOREIGN PATENT DOCUMENTS

JP 2012-020601 A 2/2012

* cited by examiner

Primary Examiner — Ian Jen
Assistant Examiner — Renee LaRose
(74) Attorney, Agent, or Firm — Smith, Gambrell & Russell, LLP

(57) ABSTRACT

A seat control system for a vehicle includes a seat, a seat position changer, a door sensor, and a controller. When an occupant performs registration operation after an ignition switch is turned on, the controller is configured to: if the door sensor senses a closed state, store a current seat position of the seat as a driving position, in association with the information of the occupant; and, if the door sensor senses an open state, store the current seat position as a get-out position at a time when the occupant gets off the vehicle, in association with the information. After the registration operation is performed, the controller is configured to: change the seat position to the driving position by controlling the seat position changer before the vehicle travels; and change the seat position to the get-out position by controlling the seat position changer when the occupant gets off the vehicle.

13 Claims, 10 Drawing Sheets

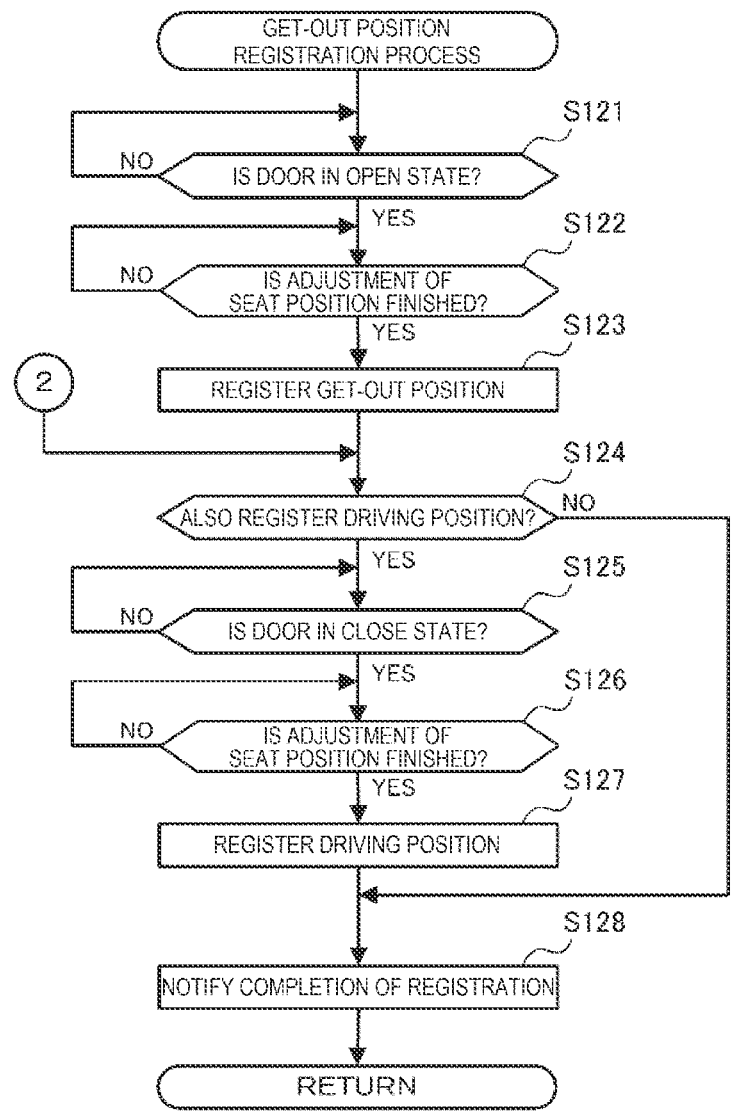

SEAT CONTROL SYSTEM

CROSS-REFERENCE TO RELATED APPLICATIONS

The present application claims priority from Japanese Patent Application No. 2021-159754 filed on Sep. 29, 2021, the entire contents of which are hereby incorporated by reference.

BACKGROUND

The disclosure relates to a seat control system configured to change a seat position of a vehicle seat with respect to each occupant.

Existing seat control systems are known to move a vehicle seat rearward when an occupant gets out of the vehicle and to move the vehicle seat forward when an occupant gets in the vehicle (for example, refer to Japanese Unexamined Patent Application Publication (JP-A) No. 2012-20601).

The seat control system disclosed in JP-A No. 2012-20601 determines the intention to get out of the vehicle of an occupant based on whether the ignition switch, which activates the drive unit (engine) with the use of the ignition power source, is turned off. In response to turning off the ignition switch, the seat control system moves the vehicle seat rearward by a predetermined amount. In addition, the seat control system determines the intention to get in the vehicle of an occupant, based on whether the ignition switch is turned on. In response to turning on the ignition switch, the seat control system moves the vehicle seat forward by a predetermined amount.

SUMMARY

An aspect of the disclosure provides a seat control system for a vehicle. The seat control system includes a seat, a seat position changer, a door open/close sensor, and an occupant information controller. The seat includes a seat cushion configured to support buttocks of an occupant of the vehicle and a seat back configured to support a back of the occupant. The seat position changer is configured to change a seat position that includes one or more of a height of the seat cushion, an inclination of the seat back, a front-rear position of the seat, and a swivel position of the seat. The door open/close sensor is configured to sense open and close of a door of the vehicle. The occupant information controller is configured to identify the occupant riding in the vehicle and to perform control based on information of the identified occupant. In response to the occupant performing registration operation after an ignition switch of the vehicle is turned on to drive a drive unit of the vehicle, the occupant information controller is configured to: on a condition that the door open/close sensor senses a closed state of the door of the vehicle, store, in a storage, a current seat position of the seat on which the occupant is seated as a driving position during traveling of the vehicle, in association with the information of the identified occupant; and, on a condition that the door open/close sensor senses an open state of the door of the vehicle, store, in the storage, the current seat position as a get-out position at a time when the occupant gets out of the vehicle, in association with the information of the identified occupant. After the registration operation is performed by the occupant, the occupant information controller is configured to: change the seat position to the driving position of the identified occupant by controlling the seat position changer before the vehicle travels; and change the seat position to the get-out position of the identified occupant by controlling the seat position changer at a time when the occupant gets out of the vehicle while the vehicle is stopped.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

FIG. 6 is an example of a flowchart illustrating a get-out position registration process of the seat control system of the embodiment 1.

DETAILED DESCRIPTION

Figure 1:
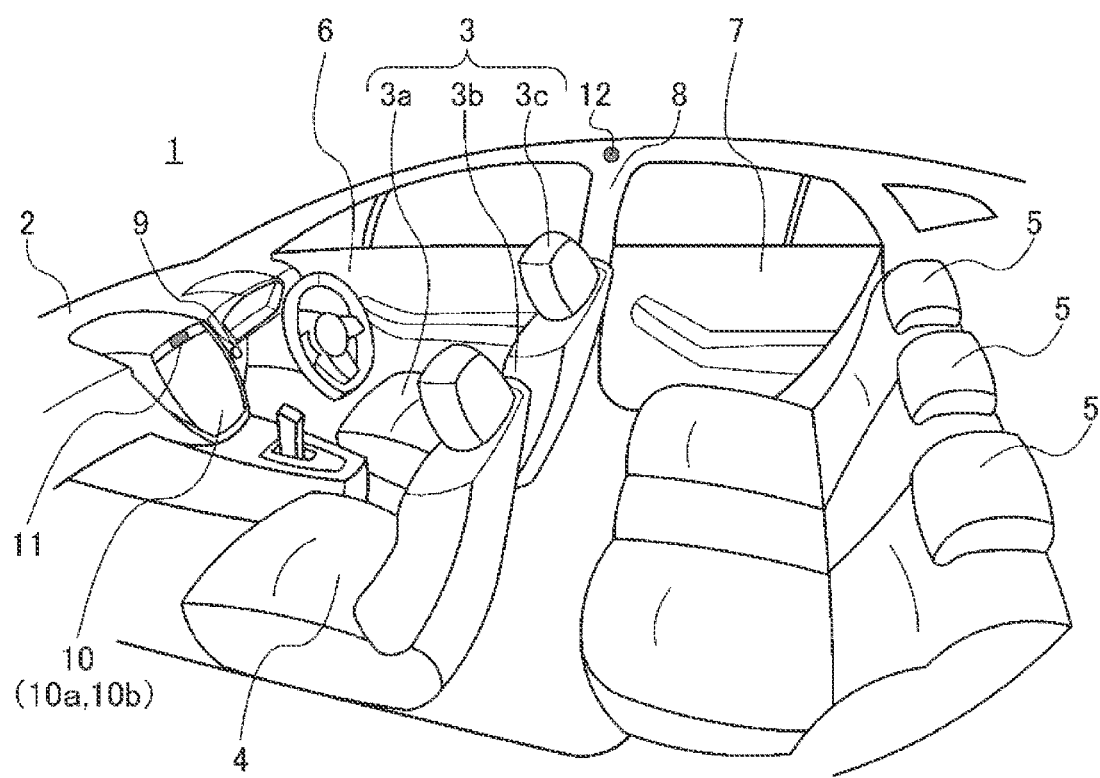
FIG. 1 is a perspective view of the interior of a vehicle equipped with a seat control system according to an embodiment 1 of the disclosure.

It has been desired for the seat control system to appropriately change the seat position of a vehicle seat with respect to each occupant and thereby improve the ease of getting in and out of the vehicle.

The seat position during traveling and the seat position at the time of getting out of the vehicle may be registered as seat positions of a vehicle seat in the manner disclosed in JP-A No. 2012-20601. Specifically, the state of traveling and the state of getting out of the vehicle are determined from turning on and off of the ignition switch, and the seat position during traveling and the seat position at the time of getting out of the vehicle are registered based on determination about turning on and off of the ignition switch. However, the ignition switch may not be turned off when an occupant gets out of the vehicle, and there may be cases in which an occupant wants to register the seat position at the time of getting out of the vehicle while the ignition switch is turned on. In view of this, it is also desired to appropriately register the seat position at the time of getting out of the vehicle, based on other information in addition to the determination about turning on and off of the ignition switch.

It is desirable to provide a seat control system configured to change a seat position of a vehicle seat with respect to each occupant, based on appropriately registered information of a seat position during traveling and a seat position at the time of getting out of the vehicle, and thereby provide the ease of getting in and out of the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In addition, one or a plurality of the components and the operations described for each embodiment may not be used for the components and the operations of the disclosure.

It should be noted that a person who drives a vehicle is called a "driver", and a person who rides in a vehicle, including a driver, is called an "occupant", in the embodiments of the disclosure. In particular, in the embodiments of the disclosure, although being operated or used mainly by a driver, a component that can be operated by or used for an occupant other than the driver is described by using the word "occupant".

Embodiment 1

Schematic Configuration of Seat Control System

A schematic configuration of a seat control system 100 according to an embodiment 1 of the disclosure will be described. FIG. 1 is a perspective view of the interior of a vehicle 1 equipped with the seat control system 100 according to the embodiment 1 of the disclosure.

As illustrated in FIG. 1, a driver seat 3 and a side seat 4 for a passenger are equipped on a rear side of an instrument panel 2 in the interior of the vehicle 1. In addition, rear seats 5 are provided behind the driver seat 3 and the side seat 4.

The driver seat 3 includes a seat cushion 3a that supports the buttocks of a driver, a seat back 3b that supports the back of a driver, and a head rest 3c that supports the head of a driver. The same applies to the side seat 4 and the rear seat 5.

An ignition switch 9 that activates a drive unit (engine) with the use of an ignition power source is provided on a driver seat 3 side of the instrument panel 2. The drive unit of the vehicle is supplied with power from the ignition power source and starts in response to turning on the ignition switch 9. Conversely, it stops in response to turning off the ignition switch 9.

A touch screen 10 is disposed at the center of the instrument panel 2. The touch screen 10 is composed of a display 10a for displaying predetermined information and an operation input unit 10b for receiving operation of an occupant.

An interior camera 11 that photographs an occupant is provided above the touch screen 10 in order to identify an occupant riding in the vehicle. The interior camera 11 is composed of a charge coupled device (CCD) camera or a complementary metal oxide semiconductor (CMOS) camera. The interior camera 11 may be disposed on a meter panel having various meters and instruments, a rear view mirror, or the like, where an occupant (in particular, a driver) riding in the vehicle can be photographed.

An object detector 12 is disposed at an upper part of a B pillar 8 between a front door 6 and a rear door 7 on the driver seat 3 side. The object detector 12 is composed of a millimeter-wave radar or an ultrasonic sensor and detects whether there is an object that may come into contact with the driver seat 3 between the driver seat 3 and the rear seat 5. The object detector 12 may be provided on a ceiling above the rear seat 5.

Block Diagram of Seat Control System

Figure 2:
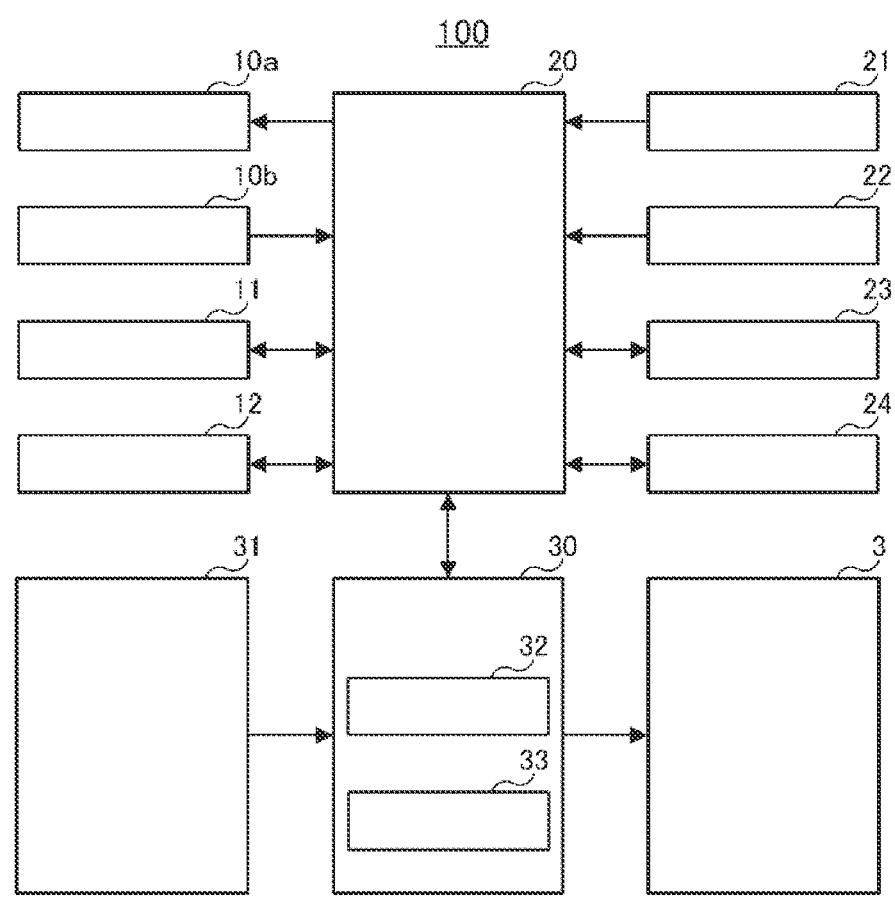
FIG. 2 is an example of a block diagram illustrating a functional configuration of the seat control system of the embodiment 1.

Next, a functional configuration of the seat control system 100 of the embodiment 1 will be described. FIG. 2 is an example of a block diagram illustrating a functional configuration of the seat control system 100 of the embodiment 1.

As illustrated in FIG. 2, the seat control system 100 includes a display 10a, an operation input unit 10b, an interior camera 11, an object detector 12, an occupant information controller 20, an ignition switch input unit 21, a door open/close sensor 22, a communication unit 23, a storage 24, a seat position changer 30, a seat operation unit 31, and the driver seat 3.

The seat of the seat control system 100 according to the embodiment of the disclosure is the driver seat 3, but it can be at least one of the driver seat 3, the side seat 4, or the rear seat 5.

The occupant information controller 20 is coupled to the display 10a, the operation input unit 10b, the interior camera 11, the object detector 12, the ignition switch input unit 21, the door open/close sensor 22, the communication unit 23, the storage 24, and the seat position changer 30. The occupant information controller 20 is composed of a central processing unit (CPU), a read only memory (ROM), a random access memory (RAM), etc., and it identifies an occupant riding in the vehicle and performs control based on the information of the identified occupant.

The ignition switch input unit 21 inputs a signal from the ignition switch 9 and is configured to determine whether the ignition switch 9 is turned on or off.

The door open/close sensor 22 includes an optical sensor and senses open and close of the door of the vehicle 1. In this embodiment, whether all doors are in the open state or in the close state is sensed. The door open/close sensor 22 may be configured to sense exclusively the open/close state of the front door 6 on the driver seat 3 side.

The communication unit 23 is used to make a wireless communication with an external device outside the vehicle 1, such as a server.

The storage 24 is composed of a non-volatile memory, such as a flash memory, and it stores various information such as a driving position and a get-out position of the driver seat 3 (described later) in association with an occupant identified by the occupant information controller 20.

The seat position changer 30 changes the "seat position" that includes at least one of the height of the seat cushion 3a, the inclination of the seat back 3b, the front-rear position (slide position) of the driver seat 3, or a swivel position (tilt position) of the driver seat 3. The seat position changer 30 is coupled to the occupant information controller 20 and changes the seat position of the driver seat 3 based on information instructed by the occupant information controller 20.

In this embodiment, the seat position while the vehicle 1 travels is called a "driving position", whereas the seat position at the time when an occupant gets out of the vehicle 1 that is stopped is called a "get-out position".

The seat position changer 30 includes a seat position drive unit 32 that changes the seat position of the driver seat 3 and also includes a seat position sensor 33 that senses the seat position of the driver seat 3.

The seat operation unit 31 is disposed on a side (not illustrated) of the driver seat 3 and is a publicly known control switch for changing the seat position of the driver seat 3 in accordance with manual operation of an occupant. The seat operation unit 31 is coupled to the seat position changer 30. In accordance with the content of manual operation to the seat operation unit 31 by an occupant, the seat position changer 30 changes the seat position of the driver seat 3.

Control Process of Seat Control System 100

Integrated Control Process

Figure 3:
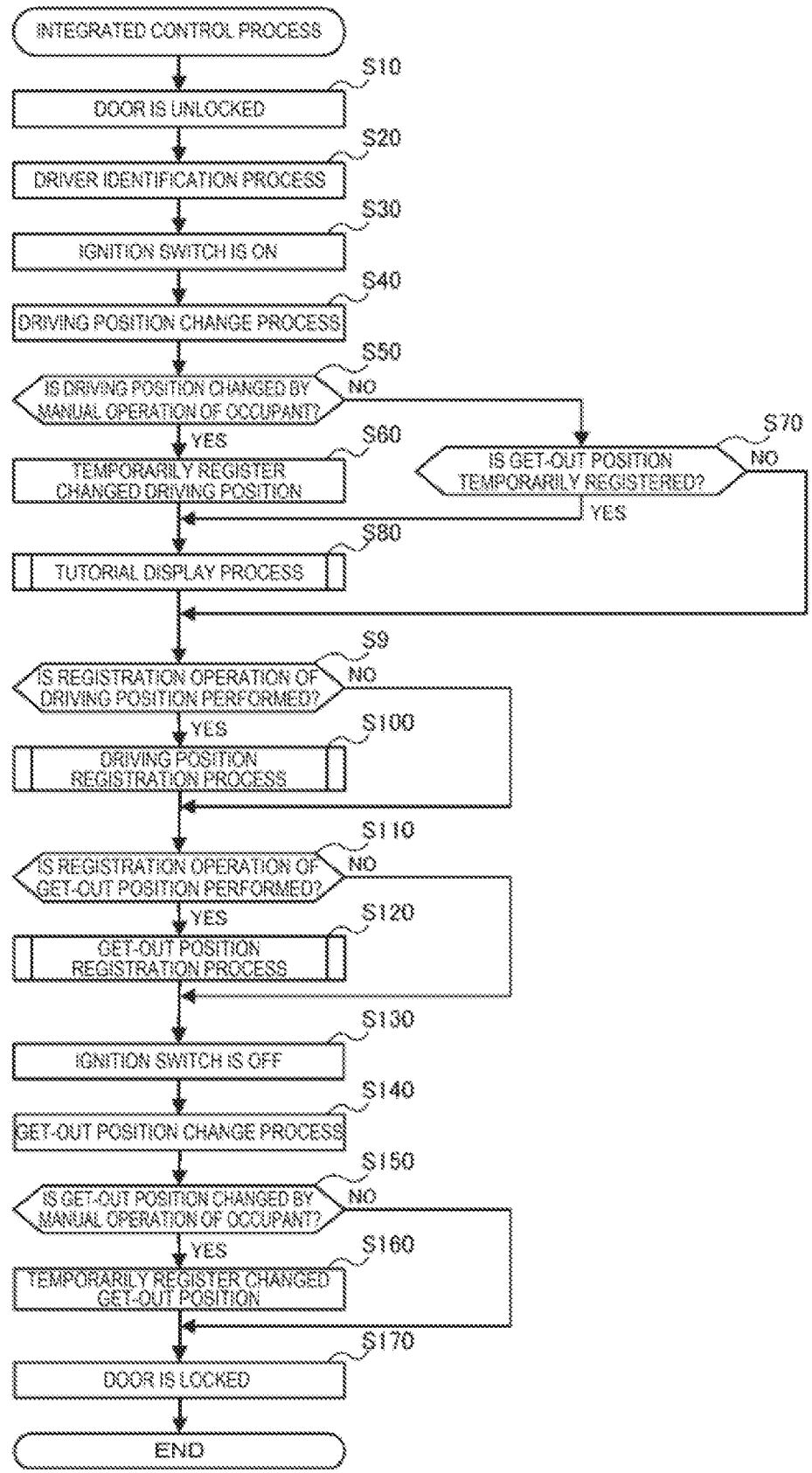
FIG. 3 is an example of a flowchart illustrating an integrated control process of the seat control system of the embodiment 1.

Next, a control process of the seat control system 100 of the embodiment 1 will be described. FIG. 3 is an example of a flowchart illustrating an integrated control process of the seat control system 100 of the embodiment 1.

In step S10, the occupant information controller 20 determines whether the door of the vehicle 1 is unlocked, and it moves the process to step S20 in response to the vehicle 1 being unlocked.

In step S20, the occupant information controller 20 performs a driver identification process for identifying a driver. After finishing this process, the occupant information controller 20 moves the process to step S30.

In the driver identification process, the occupant information controller 20 makes the interior camera 11 take a photograph of the driver and identifies the driver from the face information of the driver in the photograph. Then, the occupant information controller 20 acquires driver identification information of the identified driver (e.g., driver "A") from the storage 24.

In step S30, the occupant information controller 20 determines whether the ignition switch 9 is turned on, and it moves the process to step S40 in response to turning on the ignition switch 9. In one example, the occupant information controller 20 refers to the input state of the ignition switch input unit 21, and it determines that the ignition switch 9 is turned on, in response to turning on the ignition switch 9 (by generally-called on-edge detection). In the case in which the ignition switch 9 is turned on, the occupant information controller 20 moves the process to step S40 in order to prepare for travel of the vehicle.

In step S40, the occupant information controller 20 controls the seat position changer 30 to perform a driving position change process for changing the seat position of the driver seat 3 to the driving position. After finishing this process, the occupant information controller 20 moves the process to step S50.

The driving position change process is performed as follows: the occupant information controller 20 acquires the driving position associated with the driver identification information, from the storage 24, and it controls the drive of the seat position drive unit 32 to change the seat position of the driver seat 3 to the acquired driving position while sensing the seat position of the driver seat 3 with the use of the seat position sensor 33. Meanwhile, the occupant information controller 20 determines whether there is an object that may come into contact with the driver seat 3 between the driver seat 3 and the rear seat 5, by using the object detector 12. When there is such an object, the occupant information controller 20 changes the seat position of the driver seat 3 to the driving position while maintaining a specified distance between the driver seat 3 and the object. In the state in which the seat position is not changed to the registered driving position due to existence of the object, the occupant information controller 20 desirably displays this state on the display 10a.

In step S50, the occupant information controller 20 determines whether the driving position of the driver seat 3 is changed by manual operation to the seat operation unit 31 of an occupant. The occupant information controller 20 moves the process to step S60 upon determining that the driving position of the driver seat 3 is changed. Otherwise, the occupant information controller 20 moves the process to step S70 upon determining that the driving position of the driver seat 3 is not changed.

In step S60, the occupant information controller 20 temporarily registers the changed driving position of the driver seat 3 in association with the driver identification information. After finishing this process, the occupant information controller 20 moves the process to step S80. This temporarily registered driving position can be definitely registered or deleted in a tutorial display process in step S80 (described later).

In step S70, the occupant information controller 20 determines whether the get-out position is temporarily registered in the driver identification information that is acquired in step S20. The temporarily registered get-out position is information in which a get-out position that is changed at the previous time when a driver gets out of the vehicle is temporarily registered in association with the driver identification information at that time, as described later in relation to step S160. The temporarily registered get-out position can be definitely registered or deleted in the tutorial display process in step S80 (described later). The occupant information controller 20 moves the process to step S80 upon determining that the get-out position is temporarily registered. Otherwise, the occupant information controller 20 moves the process to step S9 upon determining that the get-out position is not temporarily registered.

In step S80, the occupant information controller 20 performs the tutorial display process for displaying an operation recommendation that prompts registration operation for registering at least one of the driving position and the get-out position. The tutorial display process allows the temporarily registered driving position or get-out position to be definitely registered or deleted and also allows registration of a new driving position or get-out position irrespective of the temporarily registered driving position and get-out position. Details of this tutorial display process will be described later by using FIG. 4. After finishing this process, the occupant information controller 20 moves the process to step S9.

In step S9, the occupant information controller 20 determines whether the registration operation for registering the driving position is performed to the operation input unit 10b. The occupant information controller 20 moves the process to step S100 upon determining that the registration operation for registering the driving position is performed. Otherwise, the occupant information controller 20 moves the process to step S110 upon determining that the registration operation for registering the driving position is not performed.

In step S100, the occupant information controller 20 performs a driving position registration process for registering a new driving position. Details of this driving position registration process will be described later by using FIG. 5. After finishing this process, the occupant information controller 20 moves the process to step S110.

In step S110, the occupant information controller 20 determines whether the registration operation for registering the get-out position is performed to the operation input unit 10*b*. The occupant information controller 20 moves the process to step S120 upon determining that the registration operation for registering the get-out position is performed. Otherwise, the occupant information controller 20 moves the process to step S130 upon determining that the registration operation for registering the get-out position is not performed.

In step S120, the occupant information controller 20 performs a get-out position registration process for registering a new get-out position. Details of this get-out position registration process will be described later by using FIG. 6. After finishing this process, the occupant information controller 20 moves the process to step S130.

In step S130, the occupant information controller 20 determines whether the ignition switch 9 is turned off, and it moves the process to step S140 in response to turning off the ignition switch 9. In one example, the occupant information controller 20 refers to the input state of the ignition switch input unit 21, and it determines that the ignition switch 9 is turned off, in response to turning off the ignition switch 9 (by generally-called off-edge detection). In the case in which the ignition switch 9 is turned off, the occupant information controller 20 moves the process to step S140 in order to prepare for getting out of the vehicle of the occupant during stop of the vehicle.

In step S140, the occupant information controller 20 controls the seat position changer 30 to perform a get-out position change process for changing the seat position of the driver seat 3 to the get-out position. After finishing this process, the occupant information controller 20 moves the process to step S150.

The get-out position change process is performed as follows: the occupant information controller 20 acquires the get-out position associated with the driver identification information, from the storage 24, and it controls the drive of the seat position drive unit 32 to change the seat position of the driver seat 3 to the acquired get-out position while sensing the seat position of the driver seat 3 with the use of the seat position sensor 33. Meanwhile, the occupant information controller 20 determines whether there is an object that may come into contact with the driver seat 3 between the driver seat 3 and the rear seat 5, by using the object detector 12. When there is such an object, the occupant information controller 20 changes the seat position of the driver seat 3 to the get-out position while maintaining a specified distance between the driver seat 3 and the object. In the state in which the seat position is not changed to the registered get-out position due to existence of the object, the occupant information controller 20 desirably displays this state on the display 10*a*.

In step S150, the occupant information controller 20 determines whether the get-out position of the driver seat 3 is changed by manual operation to the seat operation unit 31 of an occupant. The occupant information controller 20 moves the process to step S160 upon determining that the get-out position of the driver seat 3 is changed. Otherwise, the occupant information controller 20 moves the process to step S170 upon determining that the get-out position of the driver seat 3 is not changed.

In step S160, the occupant information controller 20 temporarily registers the changed get-out position of the driver seat 3 in association with the driver identification information. After finishing this process, the occupant information controller 20 moves the process to step S170.

In step S170, the occupant information controller 20 determines whether the door of the vehicle 1 is locked, and it completes the integrated control process in response to the door of the vehicle 1 being locked.

Tutorial Display Process: Embodiment 1

Figure 4:
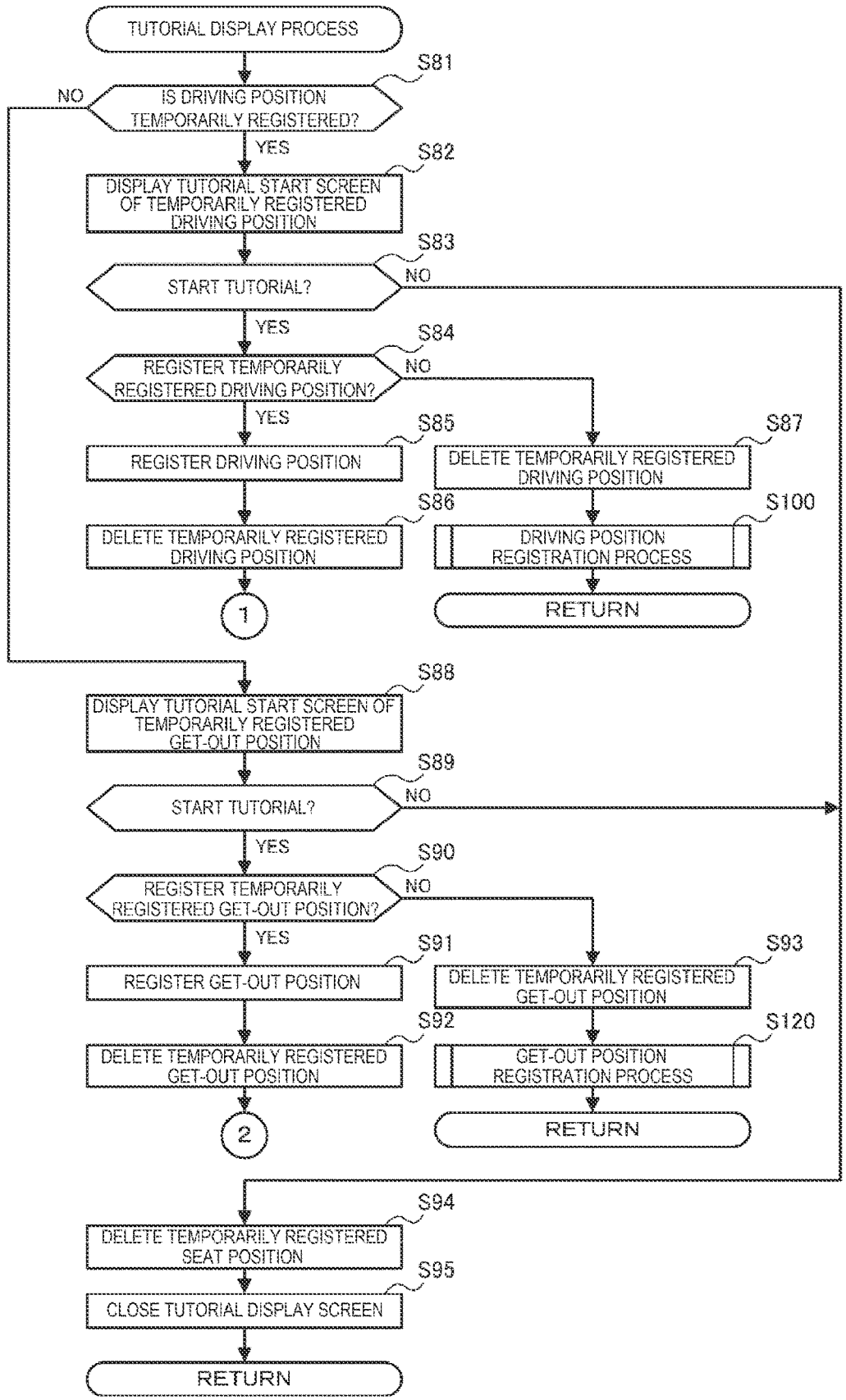
FIG. 4 is an example of a flowchart illustrating a tutorial display process of the seat control system of the embodiment 1.

Next, details of the tutorial display process involved in the integrated control process of the seat control system 100 of the embodiment 1 will be described. FIG. 4 is an example of a flowchart illustrating the tutorial display process of the seat control system 100 of the embodiment 1. It should be noted that examples of display screens of this tutorial will be detailed later by using FIGS. 7A to 8D.

The occupant information controller 20 determines whether the driving position is temporarily registered, in step S81. The occupant information controller 20 moves the process to step S82 upon determining that the driving position is temporarily registered. Otherwise, the occupant information controller 20 moves the process to step S88 upon determining that the driving position is not temporarily registered.

In step S82, the occupant information controller 20 makes the display 10*a* display a tutorial start screen in accordance with the temporarily registered driving position. After finishing this process, the occupant information controller 20 moves the process to step S83.

In step S83, the occupant information controller 20 determines whether to start the tutorial, based on operation to the operation input unit 10*b* by an occupant. The occupant information controller 20 moves the process to step S84 upon determining to start the tutorial. Otherwise, the occupant information controller 20 moves the process to step S94 upon determining to cancel the tutorial (finish the tutorial).

In step S84, the occupant information controller 20 determines whether to register the temporarily registered driving position, based on operation to the operation input unit 10*b* by an occupant. The occupant information controller 20 moves the process to step S85 upon determining to register the temporarily registered driving position. Otherwise, the occupant information controller 20 moves the process to step S87 upon determining to cancel registration of the temporarily registered driving position.

In step S85, the occupant information controller 20 registers the temporarily registered driving position in association with the driver identification information, in the storage 24. After finishing this process, the occupant information controller 20 moves the process to step S86.

The occupant information controller 20 deletes the temporarily registered driving position, in step S86. After finishing this process, the occupant information controller 20 moves the process to step S104 of the driving position registration process (described later) illustrated in FIG. 5, in order to confirm whether to also register the get-out position next.

The occupant information controller 20 deletes the temporarily registered driving position, in step S87. After finishing this process, the occupant information controller 20 moves the process to step S100.

In step S100, the driving position registration process for registering a new driving position is performed. Details of this driving position registration process will be described later by using FIG. 5. After finishing this process, the occupant information controller 20 terminates the tutorial display process and returns the process to the integrated control process (FIG. 3).

In step S88, the occupant information controller 20 makes the display 10a display a tutorial start screen in accordance with the temporarily registered get-out position. After finishing this process, the occupant information controller 20 moves the process to step S89.

In step S89, the occupant information controller 20 determines whether to start the tutorial, based on operation to the operation input unit 10b by an occupant. The occupant information controller 20 moves the process to step S90 upon determining to start the tutorial. Otherwise, the occupant information controller 20 moves the process to step S94 upon determining to cancel the tutorial (finish the tutorial).

In step S90, the occupant information controller 20 determines whether to register the temporarily registered get-out position, based on operation to the operation input unit 10b by an occupant. The occupant information controller 20 moves the process to step S91 upon determining to register the temporarily registered get-out position. Otherwise, the occupant information controller 20 moves the process to step S93 upon determining to cancel registration of the temporarily registered get-out position.

In step S91, the occupant information controller 20 registers the temporarily registered get-out position in association with the driver identification information, in the storage 24. After finishing this process, the occupant information controller 20 moves the process to step S92.

The occupant information controller 20 deletes the temporarily registered get-out position, in step S92. After finishing this process, the occupant information controller 20 moves the process to step S124 of the get-out position registration process (described later) illustrated in FIG. 6, in order to confirm whether to also register the driving position next.

The occupant information controller 20 deletes the temporarily registered get-out position, in step S93. After finishing this process, the occupant information controller 20 moves the process to step S120.

In step S120, the occupant information controller 20 performs the get-out position registration process for registering a new get-out position. Details of this get-out position registration process will be described later by using FIG. 6. After finishing this process, the occupant information controller 20 terminates the tutorial display process and returns the process to the integrated control process (FIG. 3).

In step S94, the occupant information controller 20 deletes the temporarily registered seat position (driving position or get-out position). After finishing this process, the occupant information controller 20 moves the process to step S95.

The occupant information controller 20 closes the tutorial display screen in step S95. After finishing this process, the occupant information controller 20 terminates the tutorial display process and returns the process to the integrated control process (FIG. 3).

(Driving Position Registration Process)

Figure 5:
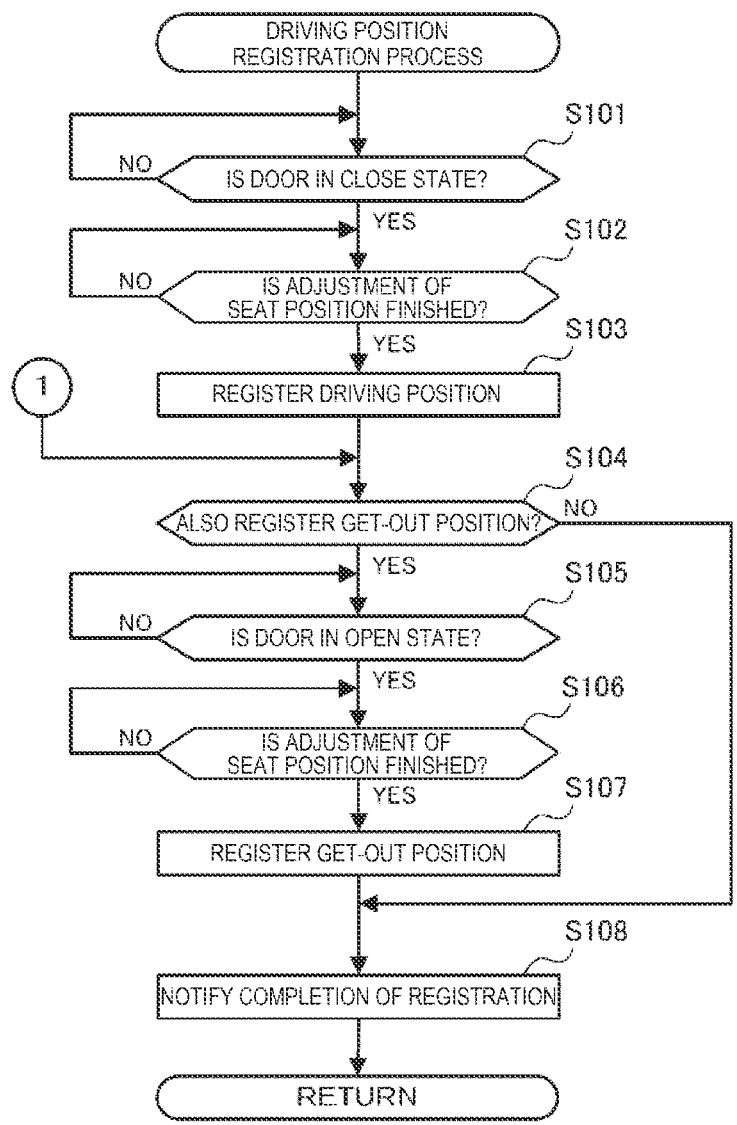
FIG. 5 is an example of a flowchart illustrating a driving position registration process of the seat control system of the embodiment 1.

Next, details of the driving position registration process involved in the integrated control process and in the tutorial display process of the seat control system 100 of the embodiment 1 will be described. FIG. 5 is an example of a flowchart illustrating the driving position registration process of the seat control system 100 of the embodiment 1.

In step S101, the occupant information controller 20 determines whether the door of the vehicle 1 is in the close state, with the use of the door open/close sensor 22. The occupant information controller 20 moves the process to step S102 upon determining that the door is in the close state. Otherwise, the occupant information controller 20 waits until the door is closed, upon determining that the door is not in the close state.

In step S102, the occupant information controller 20 determines whether adjustment of the seat position of the driver seat 3 is finished. The occupant information controller 20 moves the process to step S103 upon determining that adjustment of the seat position of the driver seat 3 is finished. Otherwise, the occupant information controller 20 waits until adjustment of the seat position of the driver seat 3 is finished, upon determining that adjustment of the seat position of the driver seat 3 is not finished. In one example, the occupant information controller 20 determines that adjustment of the seat position of the driver seat 3 is finished, upon receiving notification of finish of adjustment of the seat position from an occupant. The occupant provides this notification by operating the operation input unit 10b, after manually operating the seat operation unit 31 to adjust the seat position.

In step S103, the occupant information controller 20 registers the current seat position of the driver seat 3 as the driving position in association with the driver identification information, in the storage 24. After finishing this process, the occupant information controller 20 moves the process to step S104.

In step S104, the occupant information controller 20 determines whether to also register the get-out position, based on operation to the operation input unit 10b by an occupant. The occupant information controller 20 moves the process to step S105 upon determining to also register the get-out position. Otherwise, the occupant information controller 20 moves the process to step S108 upon determining to cancel registration of the get-out position.

In step S105, the occupant information controller 20 determines whether the door of the vehicle 1 is in the open state, with the use of the door open/close sensor 22. The occupant information controller 20 moves the process to step S106 upon determining that the door is in the open state. Otherwise, the occupant information controller 20 waits until the door is opened, upon determining that the door is not in the open state.

In step S106, the occupant information controller 20 determines whether adjustment of the seat position of the driver seat 3 is finished. The occupant information controller 20 moves the process to step S107 upon determining that adjustment of the seat position of the driver seat 3 is finished. Otherwise, the occupant information controller 20 waits until adjustment of the seat position of the driver seat 3 is finished, upon determining that adjustment of the seat position of the driver seat 3 is not finished. In one example, the occupant information controller 20 determines that adjustment of the seat position of the driver seat 3 is finished, upon receiving notification of finish of adjustment of the seat position from an occupant. The occupant provides this notification by operating the operation input unit 10b, after manually operating the seat operation unit 31 to adjust the seat position.

In step S107, the occupant information controller 20 registers the current seat position of the driver seat 3 as the get-out position in association with the driver identification information, in the storage 24. After finishing this process, the occupant information controller 20 moves the process to step S108.

In step S108, the occupant information controller 20 makes the display 10a display a display screen that notifies completion of registration of the seat position of the driver seat 3, to notify completion of registration. After finishing this process, the occupant information controller 20 terminates the driving position registration process and returns the process to the integrated control process (FIG. 3).

(Get-Out Position Registration Process)

Next, details of the get-out position registration process involved in the integrated control process and in the tutorial display process of the seat control system 100 of the embodiment 1 will be described. FIG. 6 is an example of a flowchart illustrating the get-out position registration process of the seat control system 100 of the embodiment 1.

In step S121, the occupant information controller 20 determines whether the door of the vehicle 1 is in the open state, with the use of the door open/close sensor 22. The occupant information controller 20 moves the process to step S122 upon determining that the door is in the open state. Otherwise, the occupant information controller 20 waits until the door is opened, upon determining that the door is not in the open state.

In step S122, the occupant information controller 20 determines whether adjustment of the seat position of the driver seat 3 is finished.

The occupant information controller 20 moves the process to step S123 upon determining that adjustment of the seat position of the driver seat 3 is finished. Otherwise, the occupant information controller 20 waits until adjustment of the seat position of the driver seat 3 is finished, upon determining that adjustment of the seat position of the driver seat 3 is not finished. In one example, the occupant information controller 20 determines that adjustment of the seat position of the driver seat 3 is finished, upon receiving notification of finish of adjustment of the seat position from an occupant. The occupant provides this notification by operating the operation input unit 10b, after manually operating the seat operation unit 31 to adjust the seat position.

In step S123, the occupant information controller 20 registers the current seat position of the driver seat 3 as the get-out position in association with the driver identification information, in the storage 24. After finishing this process, the occupant information controller 20 moves the process to step S124.

In step S124, the occupant information controller 20 determines whether to also register the driving position, based on operation to the operation input unit 10b by an occupant. The occupant information controller 20 moves the process to step S125 upon determining to also register the driving position. Otherwise, the occupant information controller 20 moves the process to step S128 upon determining to cancel registration of the driving position.

In step S125, the occupant information controller 20 determines whether the door of the vehicle 1 is in the close state, with the use of the door open/close sensor 22. The occupant information controller 20 moves the process to step S126 upon determining that the door is in the close state. Otherwise, the occupant information controller 20 waits until the door is closed, upon determining that the door is not in the close state.

In step S126, the occupant information controller 20 determines whether adjustment of the seat position of the driver seat 3 is finished. The occupant information controller 20 moves the process to step S127 upon determining that adjustment of the seat position of the driver seat 3 is finished. Otherwise, the occupant information controller 20 waits until adjustment of the seat position of the driver seat 3 is finished, upon determining that adjustment of the seat position of the driver seat 3 is not finished. In one example, the occupant information controller 20 determines that adjustment of the seat position of the driver seat 3 is finished, upon receiving notification of finish of adjustment of the seat position from an occupant. The occupant provides this notification by operating the operation input unit 10b, after manually operating the seat operation unit 31 to adjust the seat position.

In step S127, the occupant information controller 20 registers the current seat position of the driver seat 3 as the driving position in association with the driver identification information, in the storage 24. After finishing this process, the occupant information controller 20 moves the process to step S128.

In step S128, the occupant information controller 20 makes the display 10a display a display screen that notifies completion of registration of the seat position of the driver seat 3, to notify completion of registration. After finishing this process, the occupant information controller 20 terminates the get-out position registration process and returns the process to the integrated control process (FIG. 3).

Tutorial Display Screens: Embodiment 1

Examples of tutorial display screens appearing on the display 10a of the seat control system 100 will be described.

Tutorial Display Screens in the State in which Driving Position Is Temporarily Registered First, tutorial display screens appearing on the display 10a in the state in which the driving position is temporarily registered will be described with reference to FIGS. 7A to 7D. FIGS. 7A to 7D are examples of tutorial display screens appearing on the display 10a in the state in which the driving position is temporarily registered in the seat control system 100 of the embodiment 1.

Figure 7A:
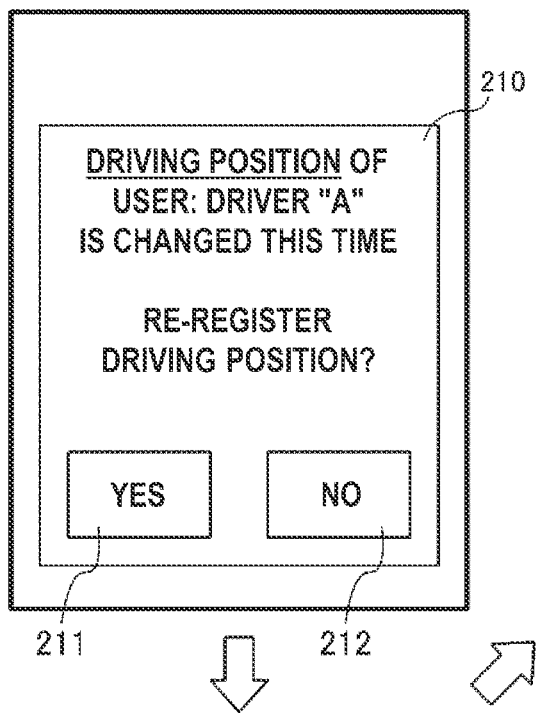
FIGS. 7A to 7D are examples of tutorial display screens appearing on a display in the state in which a driving position is temporarily registered in the seat control system of the embodiment 1.

FIG. 7A is an example of a tutorial start screen 210 first appearing on the display 10a in the state in which the driving position is temporarily registered.

As illustrated in FIG. 7A, the tutorial start screen 210 displays a message such as "The driving position is changed this time. Re-register the driving position?", together with at least a start button 211 for "YES" and an end button 212 for "NO". The start button 211 is operated to start the tutorial. The end button 212 is operated to cancel the tutorial. In response to operation to the end button 212 on the tutorial start screen 210, the tutorial display screen is closed.

Figure 7B:
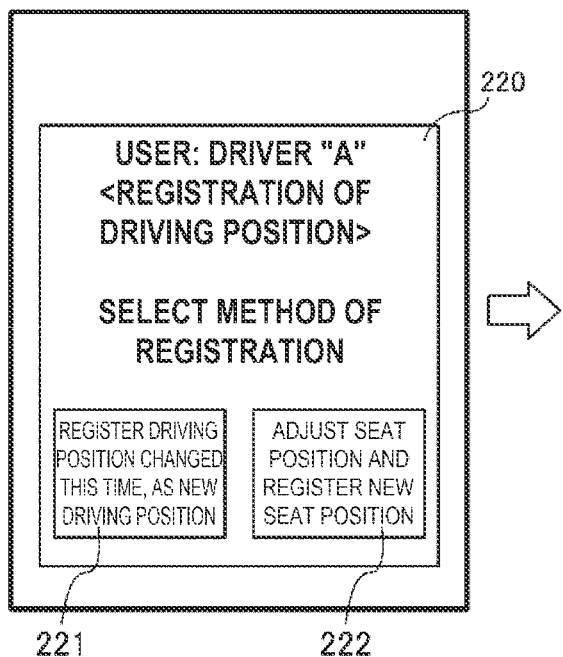

FIG. 7B is an example of a first driving position registration screen 220 of the tutorial appearing on the display 10a after the start button 211 is operated on the tutorial start screen 210.

As illustrated in FIG. 7B, the first driving position registration screen 220 indicates methods of registering the driving position, that is, displays at least a definite registration button 221 and an adjustment and registration button 222. The definite registration button 221 is used to register the temporarily registered driving position. The adjustment and registration button 222 is used to adjust the seat position and then register it as a new seat position.

Figure 7C:
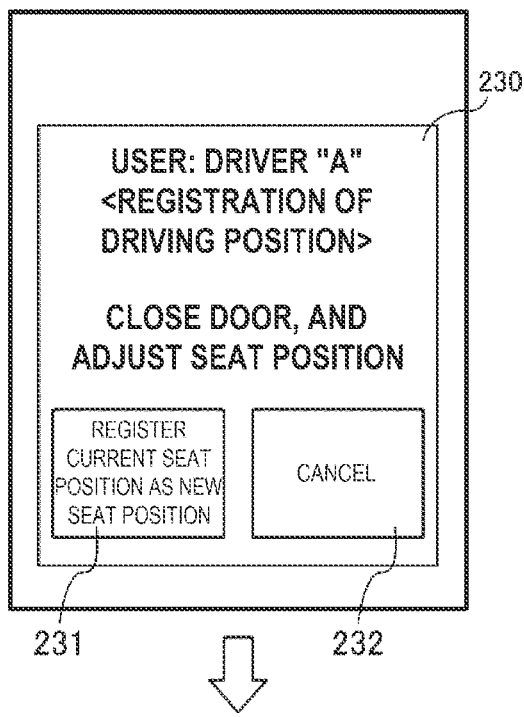

FIG. 7C is an example of a second driving position registration screen 230 of the tutorial appearing on the display 10a after the adjustment and registration button 222 is operated on the first driving position registration screen 220.

As illustrated in FIG. 7C, the second driving position registration screen 230 indicates a message such as "Close the door and adjust the seat position.", together with at least an adjustment end button 231 and a cancel button 232. The adjustment end button 231 is operated to confirm finishing adjustment of the seat position in order to end the adjustment operation. The cancel button 232 is used to cancel registration of the driving position. In response to operation to the cancel button 232, the tutorial display screen can be closed, although description of this process is omitted in relation to the flowchart described above.

Figure 7D:
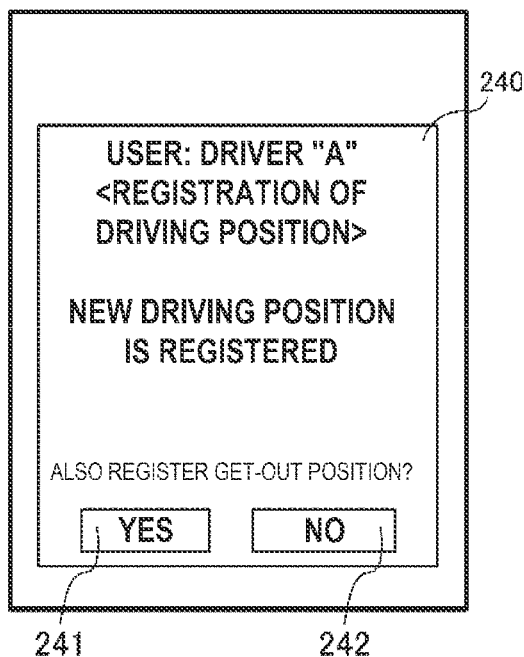

FIG. 7D is an example of a driving position registration completion screen 240 of the tutorial appearing on the display 10a after the definite registration button 221 is operated on the first driving position registration screen 220 or after the adjustment end button 231 is operated on the second driving position registration screen 230.

As illustrated in FIG. 7D, the driving position registration completion screen 240 indicates a message to notify registration of a new driving position, together with at least a button 241 for get-out position registration operation and a button 242 for canceling the get-out position registration operation. The button 241 is used to also register the get-out position, whereas the button 242 is used to cancel registration of the get-out position.

(Tutorial Display Screens in the State in which Get-Out Position is Temporarily Registered)

Next, tutorial display screens appearing on the display 10a in the state in which the get-out position is temporarily registered will be described with reference to FIGS. 8A to 8D. FIGS. 8A to 8D are examples of the tutorial display screens appearing on the display 10a in the state in which the get-out position is temporarily registered in the seat control system 100 of the embodiment 1.

Figure 8A:
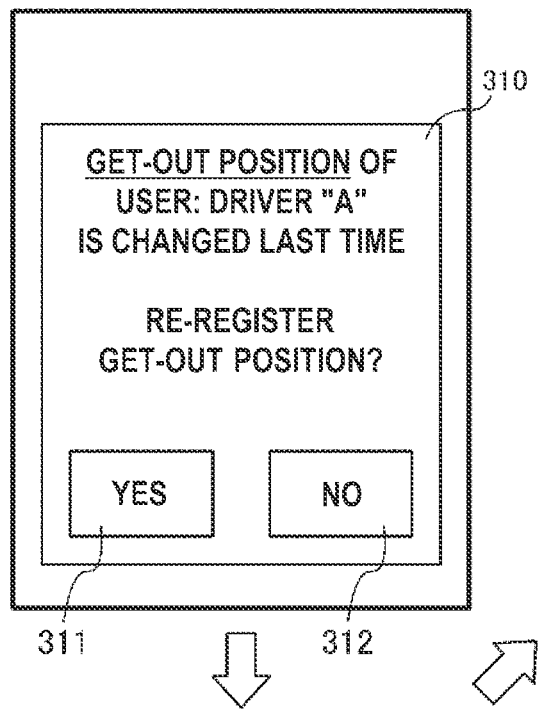
FIGS. 8A to 8D are examples of tutorial display screens appearing on the display in the state in which a get-out position is temporarily registered in the seat control system of the embodiment 1.

FIG. 8A is an example of a tutorial start screen 310 first appearing on the display 10a in the state in which the get-out position is temporarily registered.

As illustrated in FIG. 8A, the tutorial start screen 310 displays a message such as "The get-out position is changed last time. Re-register the get-out position?", together with at least a start button 311 for "YES" and an end button 312 for "NO". The start button 311 is operated to start the tutorial. The end button 312 is operated to cancel the tutorial. In response to operation to the end button 312 on the tutorial start screen 310, the tutorial display screen is closed.

Figure 8C:
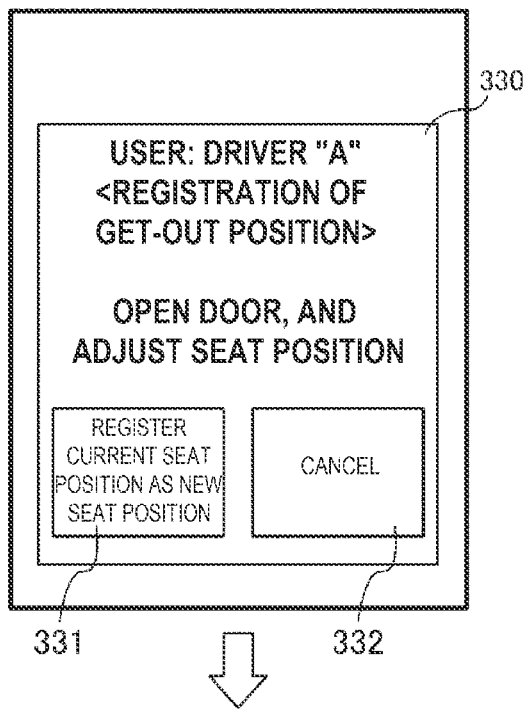
Figure 8B:
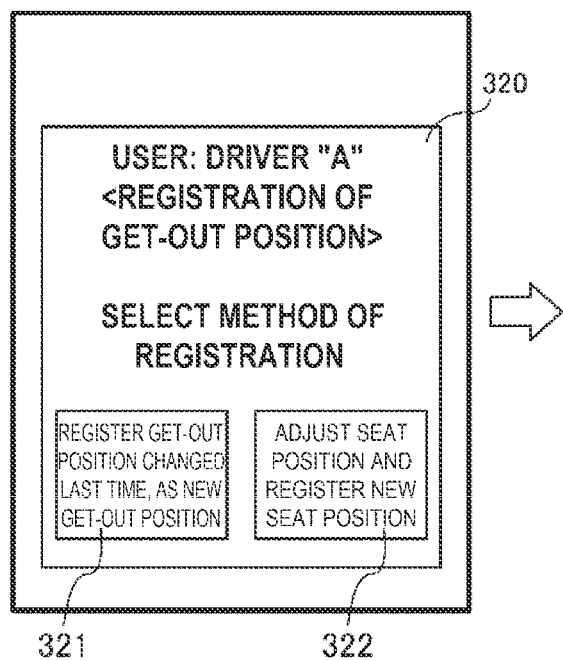

FIG. 8B is an example of a first get-out position registration screen 320 of the tutorial appearing on the display 10a after the start button 311 is operated on the tutorial start screen 310.

As illustrated in FIG. 8B, the first get-out position registration screen 320 indicates methods of registering the get-out position, that is, indicates at least a definite registration button 321 and an adjustment and registration button 322. The definite registration button 321 is used to register the temporarily registered get-out position. The adjustment and registration button 322 is used to adjust the seat position and then register it as a new seat position.

FIG. 8C is an example of a second get-out position registration screen 330 of the tutorial appearing on the display 10a after the adjustment and registration button 322 is operated on the first get-out position registration screen 320.

As illustrated in FIG. 8C, the second get-out position registration screen 330 displays a message such as "Open the door and adjust the seat position.", together with at least an adjustment end button 331 and a cancel button 332. The adjustment end button 331 is operated to confirm finishing adjustment of the seat position in order to end the adjustment operation. The cancel button 332 is used to cancel registration of the get-out position. In response to operation to the cancel button 332, the tutorial display screen can be closed, although description of this process is omitted in relation to the flowchart described above.

Figure 8D:
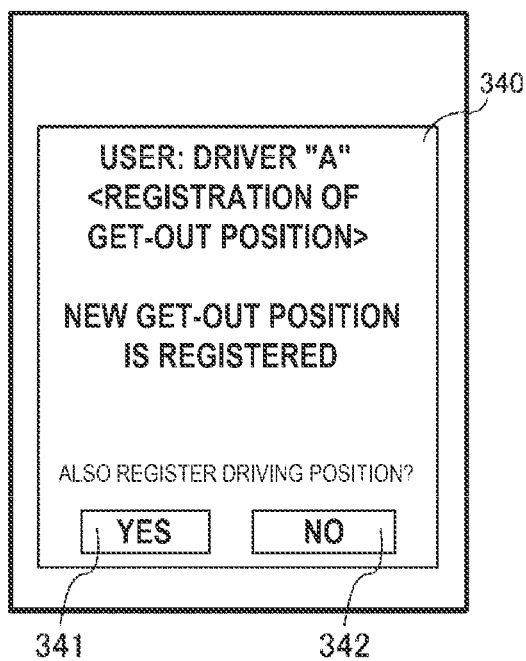

FIG. 8D is an example of a get-out position registration completion screen 340 of the tutorial appearing on the display 10a after the definite registration button 321 is operated on the first get-out position registration screen 320 or after the adjustment end button 331 is operated on the second get-out position registration screen 330.

As illustrated in FIG. 8D, the get-out position registration completion screen 340 displays a message to notify registration of a new get-out position, together with at least a button 341 for driving position registration operation and a button 342 for canceling the driving position registration operation. The button 341 is used to also register the driving position, whereas the button 342 is used to cancel registration of the driving position.

In this manner, the seat control system 100 of the embodiment 1 appropriately registers the driving position and the get-out position in associated with an identified occupant and changes the seat position of the vehicle seat with respect to each occupant, whereby the ease of getting in and out of the vehicle is improved.

In the seat control system 100 of the embodiment 1, registrations of the driving position and the get-out position are simple because they are performed by similar operation as illustrated in FIGS. 7A to 8D, although the open/close condition of the door of the vehicle 1 differs therebetween.

The seat control system 100 of the embodiment 1 displays the tutorial display screens as an operation recommendation that prompts registration operation, in the case in which the driving position or the get-out position is changed. This prevents forgetting the registration function of the seat position as well as failing to register a new seat position.

In particular, in the case in which the get-out position is changed when the ignition switch 9 is turned off, the seat control system 100 of the embodiment 1 does not display the tutorial display screens at that time, but displays them when the ignition switch 9 is turned on next time. With this function, even if a new get-out position is not registered along the tutorial display screens due to some reason of an occupant when the occupant gets out of the vehicle, the new get-out position can be registered at the next time of riding in the vehicle.

The seat control system 100 of the embodiment 1 confirms whether to register the get-out position after registration of the driving position is finished, and it also confirms whether to register the driving position after registration of the get-out position is finished. Thus, it is possible to appropriately register both of the driving position and the get-out position without fail.

Embodiment 2

The seat control system 100 according to an embodiment 2 of the disclosure will be described. The seat control system 100 of the embodiment 2 differs from the seat control system 100 of the embodiment 1 in the tutorial display process and the tutorial display screens, and other processes and components are same as those of the embodiment 1.

In one example, the tutorial display process and the tutorial display screens of the seat control system 100 of the embodiment 1 allow selecting registration of the temporarily registered seat position or registration of a new seat position by adjusting the seat position, in the case in which the already registered seat position (driving position or get-out position) is changed, as illustrated in FIGS. 7B and 8B. On the other hand, the seat control system 100 of the embodiment 2 is configured to register exclusively the temporarily registered seat position.

In the following description of the seat control system 100 of the embodiment 2, the same reference numerals and the same step numbers are used for the processes and the components that are the same as those in the seat control system 100 of the embodiment 1, and detailed description of these processes and components are omitted.

Tutorial Display Process: Embodiment 2

Figure 9:
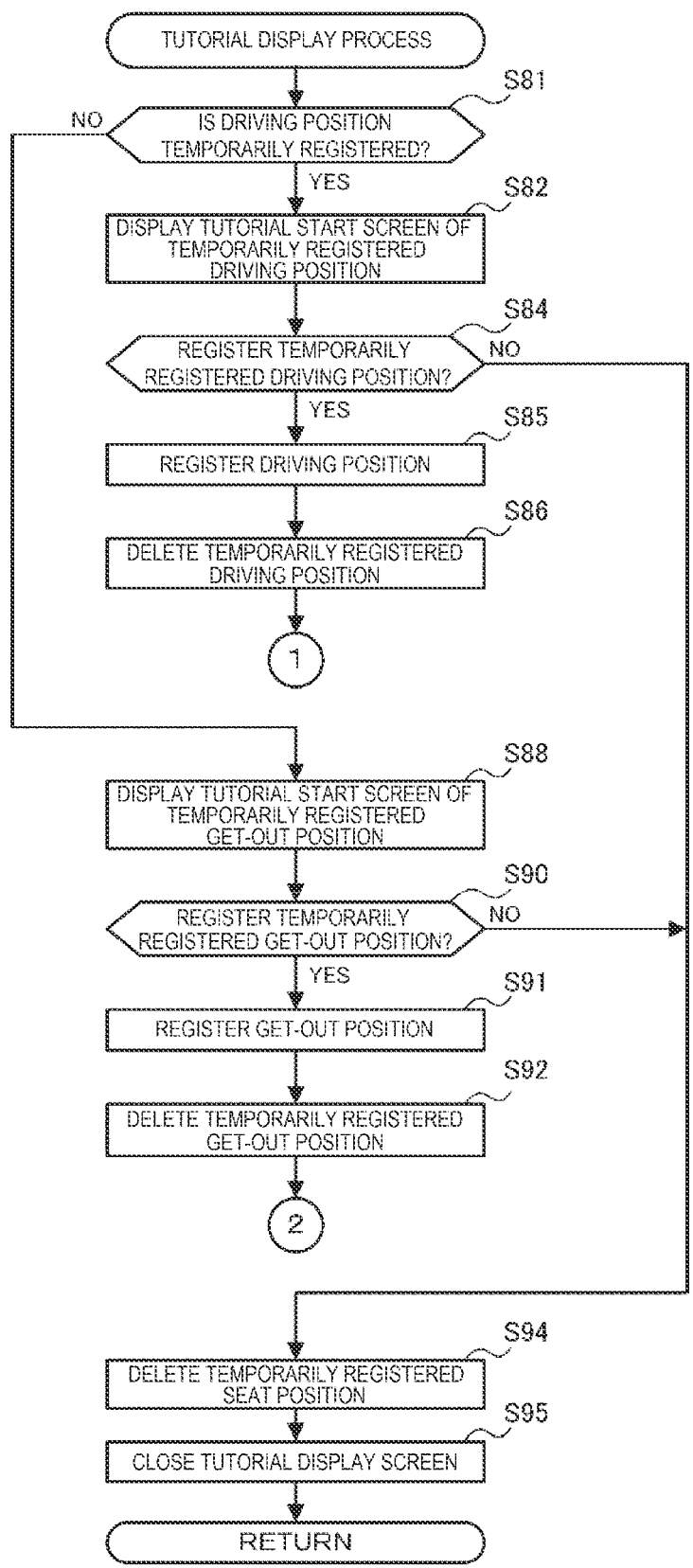
FIG. 9 is an example of a flowchart illustrating the tutorial display process of the seat control system of an embodiment 2.

Details of the tutorial display process of the seat control system 100 of the embodiment 2 will be described. FIG. 9 is an example of a flowchart illustrating the tutorial display process of the seat control system 100 of the embodiment 2. It should be noted that examples of display screens of this tutorial will be detailed later by using FIGS. 10A and 10B.

As illustrated in FIG. 9, the occupant information controller 20 does not perform the driving position registration process (step S100 in FIG. 4) upon determining to cancel registration of the temporarily registered driving position in step S84. Alternatively, the occupant information controller 20 moves the process to steps S94 and S95 and closes a tutorial start screen 410 after deleting the temporarily registered driving position.

Similarly, the occupant information controller 20 does not perform the get-out position registration process (step S120 in FIG. 4) upon determining to cancel registration of the temporarily registered get-out position in step S90. Alternatively, the occupant information controller 20 moves the process to steps S94 and S95 and closes a tutorial start screen 420 after deleting the temporarily registered get-out position.

In the tutorial display process of the embodiment 2, whether to start the tutorial is not confirmed unlike the case of the embodiment 1 (the processes in steps S83 and S89 in FIG. 4 are not performed). Thus, the occupant information controller 20 moves the process to step S84 upon finishing the process in step S82 and moves the process to step S90 upon finishing the process in step S88.

Tutorial Display Screens: Embodiment 2

Figure 10A:
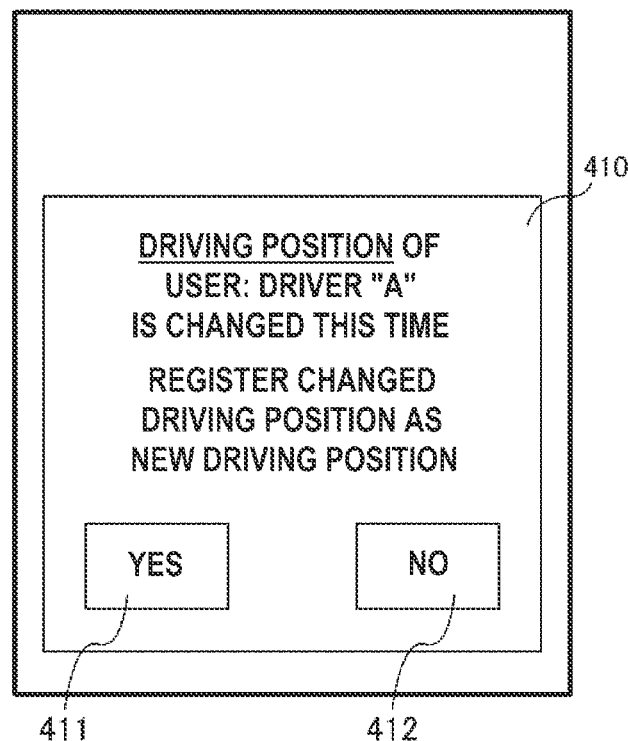
FIGS. 10A and 10B are examples of tutorial display screens appearing on the display in the seat control system of the embodiment 2.
Figure 10B:
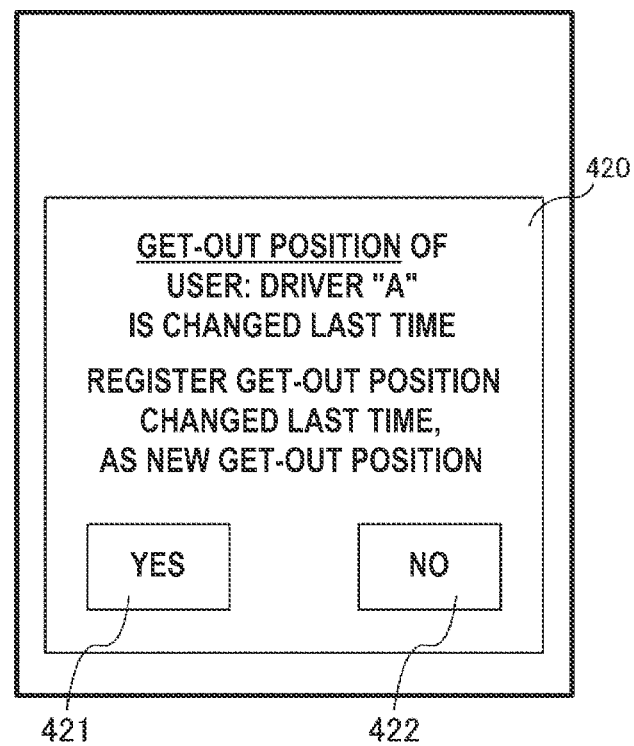

Examples of tutorial display screens appearing on the display 10a of the seat control system 100 of the embodiment 2 will be described. FIGS. 10A and 10B are examples of the tutorial display screens appearing on the display 10a of the seat control system 100 of the embodiment 2.

FIG. 10A is an example of a tutorial start screen 410 first appearing on the display 10a in the state in which the driving position is temporarily registered.

As illustrated in FIG. 10A, the tutorial start screen 410 indicates a message such as "The driving position is changed this time. Register the changed driving position as a new driving position?", together with at least a definite registration button 411 and a registration cancel button 412. The definite registration button 411 is used to register the temporarily registered driving position. The registration cancel button 412 is used to cancel registration of the temporarily registered driving position.

In response to an occupant operating the definite registration button 411 on the tutorial start screen 410, the occupant information controller 20 registers the temporarily registered driving position in association with the driver identification information, in the storage 24. On the other hand, in response to operation to the registration cancel button 412 by an occupant, the occupant information controller 20 closes the tutorial start screen 410.

FIG. 10B is an example of a tutorial start screen 420 first appearing on the display 10a in the state in which the get-out position is temporarily registered.

As illustrated in FIG. 10B, the tutorial start screen 420 indicates a message such as "The get-out position is changed last time. Register the get-out position that is changed last time as a new get-out position?", together with at least a definite registration button 421 and a registration cancel button 422. The definite registration button 421 is used to register the temporarily registered get-out position. The registration cancel button 422 is used to cancel registration of the temporarily registered get-out position.

In response to an occupant operating the definite registration button 421 on the tutorial start screen 420, the occupant information controller 20 registers the temporarily registered get-out position in association with the driver identification information, in the storage 24. On the other hand, in response to operation to the registration cancel button 422 by an occupant, the occupant information controller 20 closes the tutorial start screen 420.

In this manner, the seat control system 100 of the embodiment 2 provides the functions and the effects of the seat control system 100 of the embodiment 1, and moreover, it enables easily registering the changed seat position with a small number of steps in the case in which the already registered seat position (driving position or get-out position) is changed.

OTHER MODIFIED EXAMPLES

As described in relation to steps S30 and S40 in FIG. 3, the seat control system 100 of the embodiment 1 determines that the vehicle is about to travel, in response to turning on the ignition switch 9, and it changes the seat position of the driver seat 3 to the driving position of the identified driver.

However, the vehicle may be determined to be about to travel, in response to unlocking the door of the vehicle 1, and the seat position of the driver seat 3 may be changed to the driving position of the identified driver. In this case, the order of steps S30 and S40 may be reversed in FIG. 3, and after the process in step S20 is performed, the process in step S40 may be performed before the process in step S30.

As described in relation to steps S130 and S140 in FIG. 3, the seat control system 100 of the embodiment 1 determines that the vehicle is stopped and an occupant is about to get out of the vehicle, in response to turning off the ignition switch 9, and it changes the seat position of the driver seat 3 to the get-out position of the identified driver.

However, it may be determined that the vehicle is stopped and an occupant is about to get out of the vehicle, based on the door of the vehicle 1 being in the open state, while the vehicle is stopped. Then, the seat position of the driver seat 3 may be changed to the get-out position of the identified driver. In this case, the content of the process in step S130 in FIG. 3 may be replaced with the content of a process such as "determine whether the door of the vehicle 1 is in the open state by using the door open/close sensor 22, when receiving parking information indicating the shift lever being in the parking position, and move the process to step S140 upon determining that the door of the vehicle 1 is in the open state".

As described in relation to steps S70, S80, S150, and S160 in FIG. 3, the seat control system 100 of the embodiment 1 displays the operation recommendation on the display 10a at the time when the ignition switch 9 is turned on next time, in the case in which an occupant changes the already registered get-out position at the time of getting out of the vehicle while the vehicle is stopped.

However, instead of waiting for the next time the ignition switch 9 is turned on, the operation recommendation may be displayed on the display 10a immediately after an occupant changes the already registered get-out position. In this case, the tutorial display process in step S80 may be performed after the process in step S160 is performed, in FIG. 3.

In the seat control system 100 of the embodiment 1, the display 10a that displays certain information is provided at the center of the instrument panel 2. However, the display 10a may be provided as a part of a meter panel and instrument board display unit in front of the driver seat 3 and the steering wheel.

It is clear to those skilled in the art that the above-described embodiments, including the modified examples, can mutually use their techniques.

The description described above is not intended to limit the disclose but is simply for the purpose of illustration. Thus, it is apparent for those skilled in the art that modifications and alterations can be made to the embodiments of the disclosure within the range of Claims.

The terms that are used in this specification and Claims are construed as non-limiting terms. For example, the term "include" is construed to "not limit the components to those described herein as included components". The term "equip" is construed to "not limit the components to those described herein as equipped components".

The occupant information controller 20 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of occupant information controller 20 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of occupant information controller 20 illustrated in FIG. 2.

The invention claimed is:

1. A seat control system for a vehicle, the seat control system comprising:
 a seat comprising a seat cushion configured to support buttocks of an occupant of the vehicle and a seat back configured to support a back of the occupant;
 a seat position changer configured to change a seat position that includes one or more of a height of the seat cushion, an inclination of the seat back, a front-rear position of the seat, and a swivel position of the seat;
 a door open/close sensor configured to sense open and close of a door of the vehicle; and
 an occupant information controller configured to identify the occupant riding in the vehicle and to perform control based on information of the identified occupant, wherein the occupant information controller is configured to,
 in response to the occupant performing registration operation after an ignition switch of the vehicle is turned on to drive a drive unit of the vehicle,
  on a condition that the door open/close sensor senses a closed state of the door of the vehicle, store, in a storage, a current seat position of the seat on which the occupant is seated as a driving position during traveling of the vehicle, in association with the information of the identified occupant, and
  on a condition that the door open/close sensor senses an open state of the door of the vehicle, store, in the storage, the current seat position as a get-out position at a time when the occupant gets out of the vehicle, in association with the information of the identified occupant, and
 after the registration operation is performed by the occupant,
  change the seat position to the driving position of the identified occupant by controlling the seat position changer before the vehicle travels, and
  change the seat position to the get-out position of the identified occupant by controlling the seat position changer at a time when the occupant gets out of the vehicle while the vehicle is stopped, and
 wherein the occupant information controller is configured to carry out, prior to the registration operation and after the ignition switch of the vehicle is turned on, a temporary registration operation wherein a sensed change from a pre-set seat position to a modified seat position by the occupant operating the seat position changer is determined, and wherein the registration operation involves an option of accepting the modified seat position as a replacement stored setting of the pre-set seat position or maintaining the pre-set seat position as a stored setting.

2. The seat control system according to claim 1, further comprising:
 a display configured to display information to the occupant, wherein
 in response to the occupant operating the seat position changer and changing the seat position, the occupant information controller is configured to display, on the display, an operation recommendation that prompts the registration operation.

3. The seat control system according to claim 2, wherein
 in response to the ignition switch being turned on next time after the occupant operates the seat position changer to change the get-out position at a time of getting out of the vehicle while the vehicle is stopped, the occupant information controller is configured to display the operation recommendation on the display.

4. The seat control system according to claim 1, wherein
 the seat is a driver seat on which an occupant who drives the vehicle is to be seated,
 the seat control system further comprises an object detector configured to detect whether there is an object between the driver seat and a rear seat provided rearward of the driver seat, the object having a possibility of coming into contact with the driver seat, and
 in a case where the object detector detects that there is the object, the occupant information controller is further configured to change the seat position by controlling the seat position changer while maintaining a predetermined distance between the driver seat and the object.

5. The seat control system according to claim 2, wherein
the seat is a driver seat on which an occupant who drives the vehicle is to be seated,
the seat control system further comprises an object detector configured to detect whether there is an object between the driver seat and a rear seat provided rearward of the driver seat, the object having a possibility of coming into contact with the driver seat, and
in a case where the object detector detects that there is the object, the occupant information controller is further configured to change the seat position by controlling the seat position changer while maintaining a predetermined distance between the driver seat and the object.

6. The seat control system according to claim 3, wherein
the seat is a driver seat on which an occupant who drives the vehicle is to be seated,
the seat control system further comprises an object detector configured to detect whether there is an object between the driver seat and a rear seat provided rearward of the driver seat, the object having a possibility of coming into contact with the driver seat, and
in a case where the object detector detects that there is the object, the occupant information controller is further configured to change the seat position by controlling the seat position changer while maintaining a predetermined distance between the driver seat and the object.

7. The seat control system according to claim 1, wherein the option of selecting the modified seat position for stored setting includes an option of choosing one or each of the modified driving position and modified get-out seat position.

8. The seat control system according to claim 1, wherein under the registration operation, the option of modified seat position acceptance as a replacement of a corresponding pre-set seat position is carried out by the occupant information controller with a provided choice to the occupant of choosing one of, or each of, a modified driving position seat position setting and a modified get-out seat position setting.

9. The seat control system according to claim 1, wherein under the registration operation there is provided an option to the occupant on a display, upon an indication of an acceptance of the modified seat position, of further manual adjustments prior to a final determination of either or both of a to-be-set final driving position seat setting and a to-be-set final get-out position seat setting.

10. The seat control system according to claim 1, wherein the information of the identified occupant includes stored facial recognition information.

11. A seat control system for a vehicle, the seat control system comprising:
a seat comprising a seat cushion configured to support buttocks of an occupant of the vehicle and a seat back configured to support a back of the occupant;
a seat position changer configured to change a seat position that includes one or more of a height of the seat cushion, an inclination of the seat back, a front-rear position of the seat, and a swivel position of the seat;
a display; and
an occupant information controller configured to identify the occupant riding in the vehicle and to perform control based on information of the identified occupant, wherein the occupant information controller is configured to:
when an ignition switch of the vehicle is turned off, i) read a get-out seat position associated with the information of the identified occupant from a storage, and ii) change the seat position to the read get-out seat position associated with the information of the identified occupant by controlling the seat position changer;
after a changing of the seat position to the read get-out seat position associated with the information of the identified occupant, determine whether the seat position is changed to a modified get-out seat position different from the read get-out seat position by the occupant operating the seat position changer;
in response to a determination that the seat position is changed to the modified get-out seat position, store the modified get-out seat position in the storage as a temporary get-out seat position associated with the information of the identified occupant,
when the ignition switch is turned on, determine whether the temporary get-out seat position associated with the information of the identified occupant is stored in the storage;
in response to a determination that the temporary get-out seat position associated with the information of the identified occupant is stored in the storage, output, via the display, a query asking whether the stored temporary get-out seat position associated with the information of the identified occupant is to be stored as the get out seat position associated with the information of the identified occupant,
after an outputting of the query, determine whether a first predetermined operation is performed by the information of the identified occupant;
in response to a determination that the first predetermined operation is performed by the occupant, i) store the stored temporary get-out seat position associated with the information of the identified occupant in the storage as the get-out seat position associated with the information of the identified occupant, and then ii) delete the stored temporary get-out seat position associated with the information of the identified occupant from the storage;
in response to a determination that the first predetermined operation is not performed by the occupant, i) delete the stored temporary get-out seat position associated with the information of the identified occupant from the storage, and ii) determine whether a second predetermined operation is performed by the occupant; and
in response to a determination that the second predetermined operation is performed by the occupant, store a current seat position in the storage as the get-out seat position associated with the information of the identified occupant.

12. The seat control system according to claim 11, further comprising a door open/close sensor configured to sense open and close of a door of the vehicle,
wherein the second predetermined operation includes an operation to open the door, and
wherein the occupant information controller is configured to determine whether the second predetermined operation is performed by the occupant based on a sensing result of the door open/close sensor.

13. The seat control system according to claim 11, wherein the information of the identified occupant includes stored facial recognition information.

* * * * *